(12) United States Patent
Lee et al.

(10) Patent No.: US 12,526,938 B2
(45) Date of Patent: Jan. 13, 2026

(54) ELECTRONIC DEVICE AND LOCKING ASSEMBLY THEREOF

(71) Applicant: Getac Technology Corporation, New Taipei (TW)

(72) Inventors: Kun-Cheng Lee, Taipei (TW); Juei-Chi Chang, Taipei (TW); Tsung-Liang Hung, Taipei (TW); Chen-Ping Wang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 279 days.

(21) Appl. No.: 17/986,991

(22) Filed: Nov. 15, 2022

(65) Prior Publication Data

US 2023/0240028 A1 Jul. 27, 2023

Related U.S. Application Data

(60) Provisional application No. 63/303,449, filed on Jan. 26, 2022.

(30) Foreign Application Priority Data

Oct. 19, 2022 (CN) .......................... 202211280995.2

(51) Int. Cl.
*H05K 5/02* (2006.01)
*G06F 1/16* (2006.01)

(52) U.S. Cl.
CPC ......... *H05K 5/0221* (2013.01); *G06F 1/1616* (2013.01); *G06F 1/1679* (2013.01)

(58) Field of Classification Search
CPC .... H05K 5/0221; G06F 1/1616; G06F 1/1679
See application file for complete search history.

(56) References Cited

U.S. PATENT DOCUMENTS

| 7,427,087 B2* | 9/2008 | Chuang ................ G06F 1/1679 361/679.55 |
|---|---|---|
| 8,593,807 B2 | 11/2013 | Murakata |
| 10,444,801 B2 | 10/2019 | Shindo et al. |

(Continued)

FOREIGN PATENT DOCUMENTS

| CN | 111258372 A | 6/2020 |
|---|---|---|
| TW | M496787 U | 3/2015 |

(Continued)

*Primary Examiner* — Hung S. Bui
*Assistant Examiner* — Elisa Sasserath
(74) *Attorney, Agent, or Firm* — Troutman Pepper Locke LLP; Tim Tingkang Xia, Esq.

(57) ABSTRACT

An electronic device includes a first case, a second case, and a locking assembly. The first case includes a first fixing surface, and the first fixing surface has a locking part. The second case includes a second fixing surface and two receiving grooves, and the two receiving grooves are respectively arranged on two sides of the second fixing surface. The locking assembly includes a buckle and two elastic elements. The buckle has a hook part and fixing rods. The fixing rods are arranged on two sides of the hook part. One end of each of the fixing rods abuts against the second fixing surface and slides relative to the second fixing surface, and another end of each of the fixing rods extends into the corresponding receiving groove. The hook part is configured to buckle to the locking part.

20 Claims, 10 Drawing Sheets

(56) References Cited

U.S. PATENT DOCUMENTS

| | | | |
|---|---|---|---|
| 2004/0184228 A1 | 9/2004 | Minaguchi et al. | |
| 2006/0261600 A1 | 11/2006 | Lee | |
| 2008/0151509 A1* | 6/2008 | Chien | G06F 1/1679 |
| | | | 70/58 |
| 2011/0026197 A1 | 2/2011 | Zhao et al. | |
| 2019/0352936 A1* | 11/2019 | Chou | E05B 65/0067 |
| 2019/0361492 A1* | 11/2019 | Urimoto | H05K 5/03 |

FOREIGN PATENT DOCUMENTS

| | | |
|---|---|---|
| TW | I677144 B | 11/2019 |
| TW | I703429 B | 9/2020 |

* cited by examiner

ELECTRONIC DEVICE AND LOCKING ASSEMBLY THEREOF

CROSS-REFERENCES TO RELATED APPLICATIONS

This application claims the benefit of U.S. provisional application Ser. No. 63/303,449, filed on Jan. 26, 2022 and claims the priority of patent application No. 202211280995.2 filed in China, P.R.C. on Oct. 19, 2022. The entirety of the above-mentioned patent applications are hereby incorporated by references herein and made a part of the specification.

BACKGROUND OF THE INVENTION

The present invention relates to an electronic device and a locking assembly thereof, and particularly, to an electronic device in which two cases can be buckled and fixed to each other through a locking assembly, and a locking assembly thereof.

In a current flip electronic product (for example, a notebook computer or a tablet computer with a detachable keyboard), an upper case and a lower case of the flip electronic product are fixed to each other through a pivot mechanism, a buckle mechanism, or the like. Mainly, in a current buckle mechanism, one end of the buckle mechanism is pivoted on an upper case or a lower case, and another end of the buckle mechanism is buckled to a locking structure corresponding to the upper case or the lower case after the buckle mechanism is rotated. However, once a distance between the upper case and the lower case is changed, the buckle mechanism cannot be accurately aligned with the locking structure.

SUMMARY OF THE INVENTION

Based on the above, in an embodiment, an electronic device including a first case, a second case, and a locking assembly is provided. The first case includes a first fixing surface, and the first fixing surface has a locking part. The second case includes a second fixing surface and two receiving grooves, and the two receiving grooves are respectively arranged on two sides of the second fixing surface. The locking assembly includes a buckle and two elastic elements. The buckle has a hook part and fixing rods. The two fixing rods are arranged on two sides of the hook part, and one end of each of the fixing rods abuts against the second fixing surface and slides relative to the second fixing surface, and another end of each of the fixing rods extends into the corresponding receiving groove. The hook part is configured to buckle to the locking part. The two elastic elements are respectively accommodated in one of the two receiving grooves, and one end of each of the elastic elements is connected to the second case, and another end of each of the elastic elements is connected to the fixing rod.

In an embodiment, each of the fixing rods has an arc-shaped surface, the arc-shaped surface abuts against the second fixing surface, and a center formed by the arc-shaped surface is away from the fixing rod.

In an embodiment, the hook part is capable of moving to a first position, a second position, or a third position. The hook part eccentrically rotates to the second position based on the center of the arc-shaped surface when the hook part slides from the first position to the third position, and the hook part is buckled to the locking part when the hook part is located at the third position.

In an embodiment, the hook part has a guide surface, and the guide surface is in contact with the locking part when the hook part moves from the first position to the second position, so that the buckle is guided by the guide surface and eccentrically rotates to the second position.

In an embodiment, when the hook part is located at the second position, a distance between a top end of the hook part and the first fixing surface is a first distance, and a distance between a top end of the locking part and the first fixing surface is a second distance, where the first distance is substantially equal to the second distance.

In an embodiment, the buckle includes a first baffle, and the first baffle extends to the second fixing surface and has a first contact surface. The second fixing surface includes a second baffle, and the second baffle has a second contact surface. The first contact surface is separated from the second contact surface when the hook part is located at the first position or the third position, and the first contact surface is in contact with the second contact surface when the hook part is located at the second position.

In an embodiment, the second fixing surface includes a limiting groove, and the limiting groove is located between the second baffle and the receiving groove. The buckle includes a third baffle, and the third baffle extends into the limiting groove.

In an embodiment, each of the receiving grooves has a retaining wall. Each of the fixing rods has a first inclined surface and a second inclined surface on a side relative to the arc-shaped surface. The first inclined surface is in contact with and slides on the retaining wall when the hook part is located between the first position and the second position, and the second inclined surface is in contact with and slides on the retaining wall when the hook part is located at the second position.

In an embodiment, the retaining walls form openings with the second fixing surface, and the fixing rods respectively slide within the openings.

In an embodiment, the buckle further includes an operating part. The operating part is located on one side of the center of the arc-shaped surface, and the hook part is located on another side of the center of the arc-shaped surface. The buckle moves from the first position to the second position or the third position when the operating part is actuated.

In an embodiment, the first fixing surface includes another locking part, and the hook part is buckled to one of the locking part and the another locking part.

Various embodiments are described in detail below. However, the embodiments are merely used as examples for description and do not limit or narrow the protection scope of the present invention. In addition, some elements are omitted in the drawings in the embodiments to clearly show the technical features of the present invention. The same reference numerals are used to indicate the same or similar elements in all of the drawings.

DETAILED DESCRIPTION OF THE INVENTION

Figure 1:
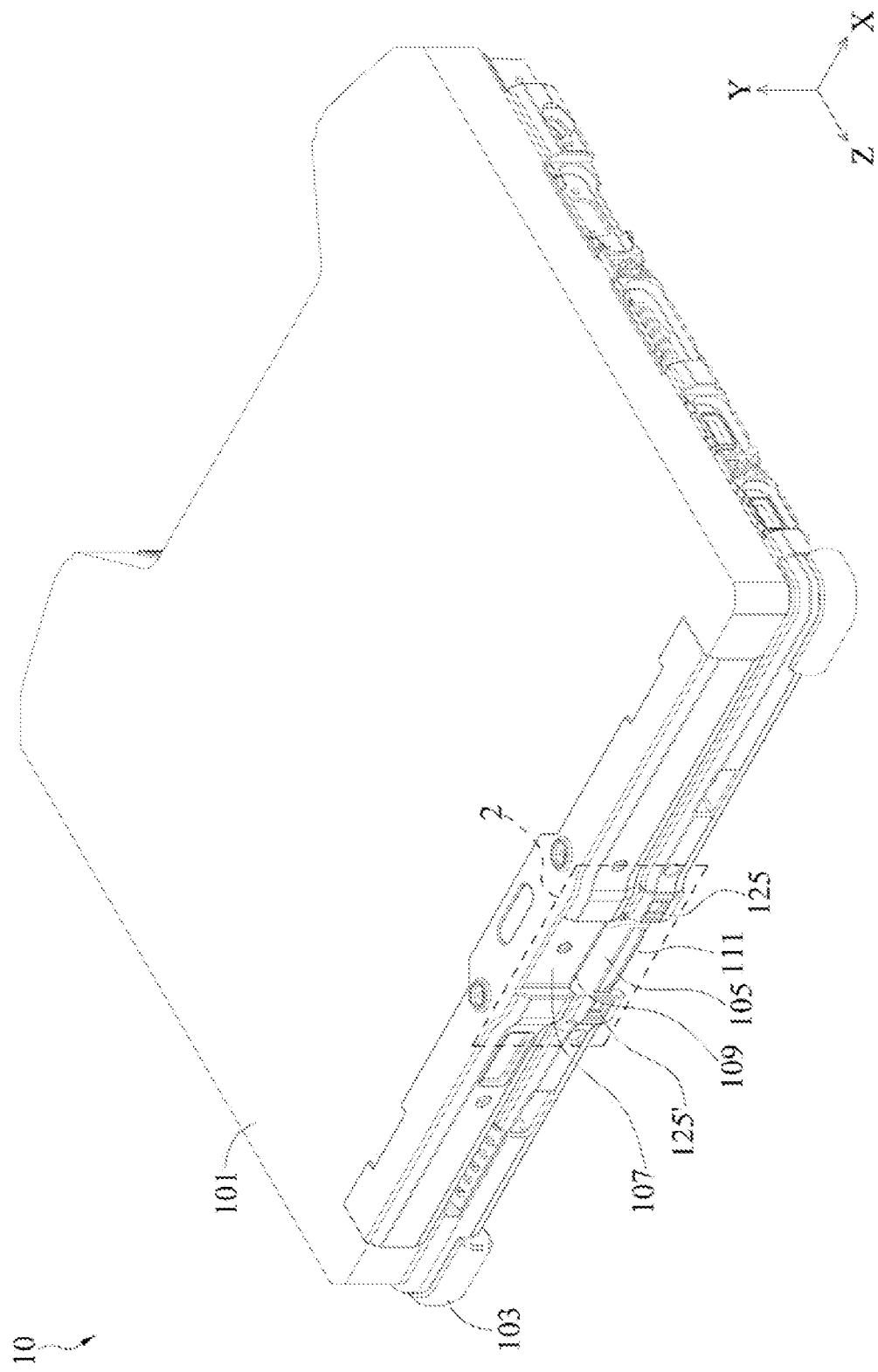
FIG. 1 is a three-dimensional view of an electronic device according to a first embodiment of the present invention.
Figure 2:
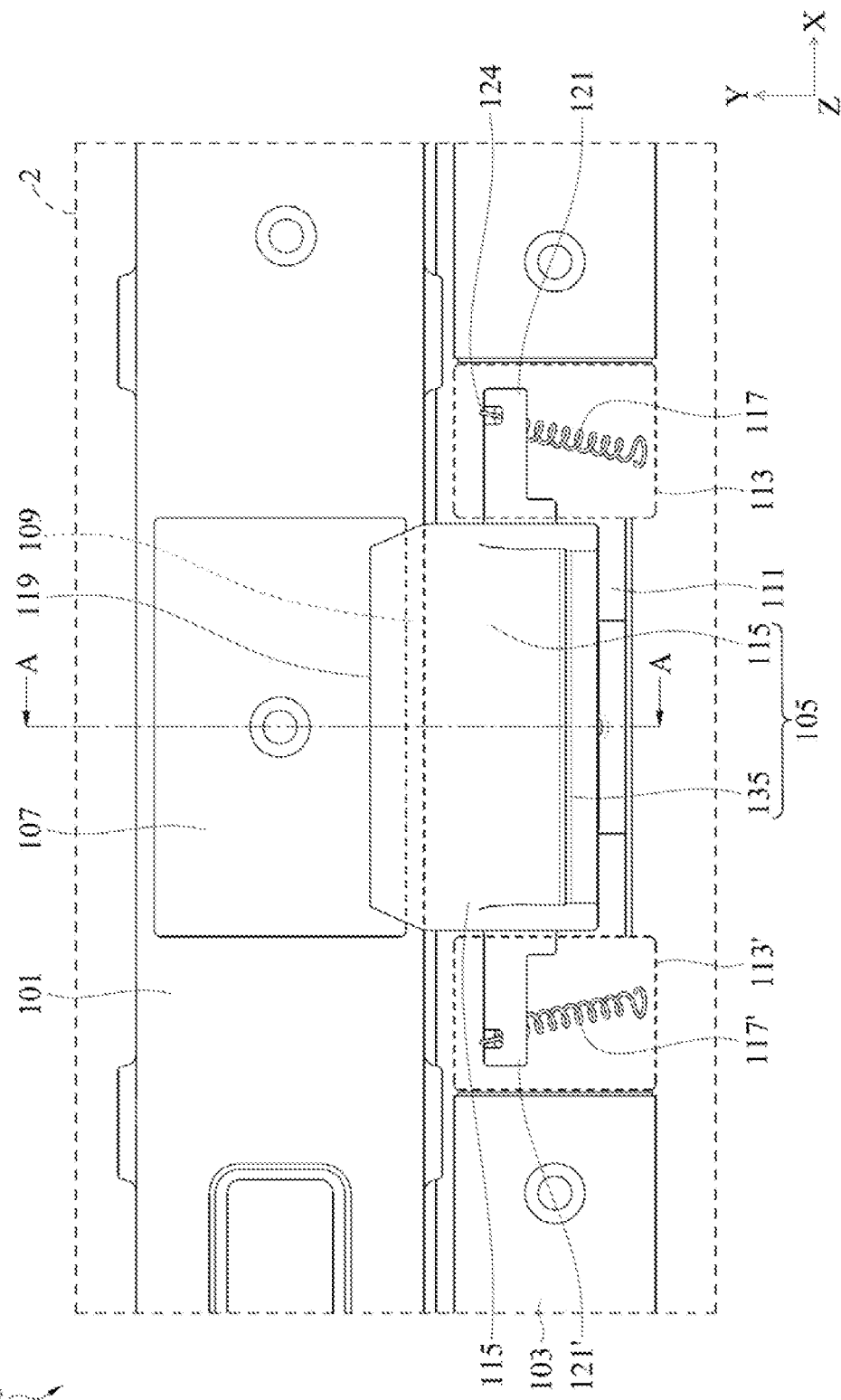
FIG. 2 is a front view of a part of the electronic device framed in FIG. 1.
Figure 3:
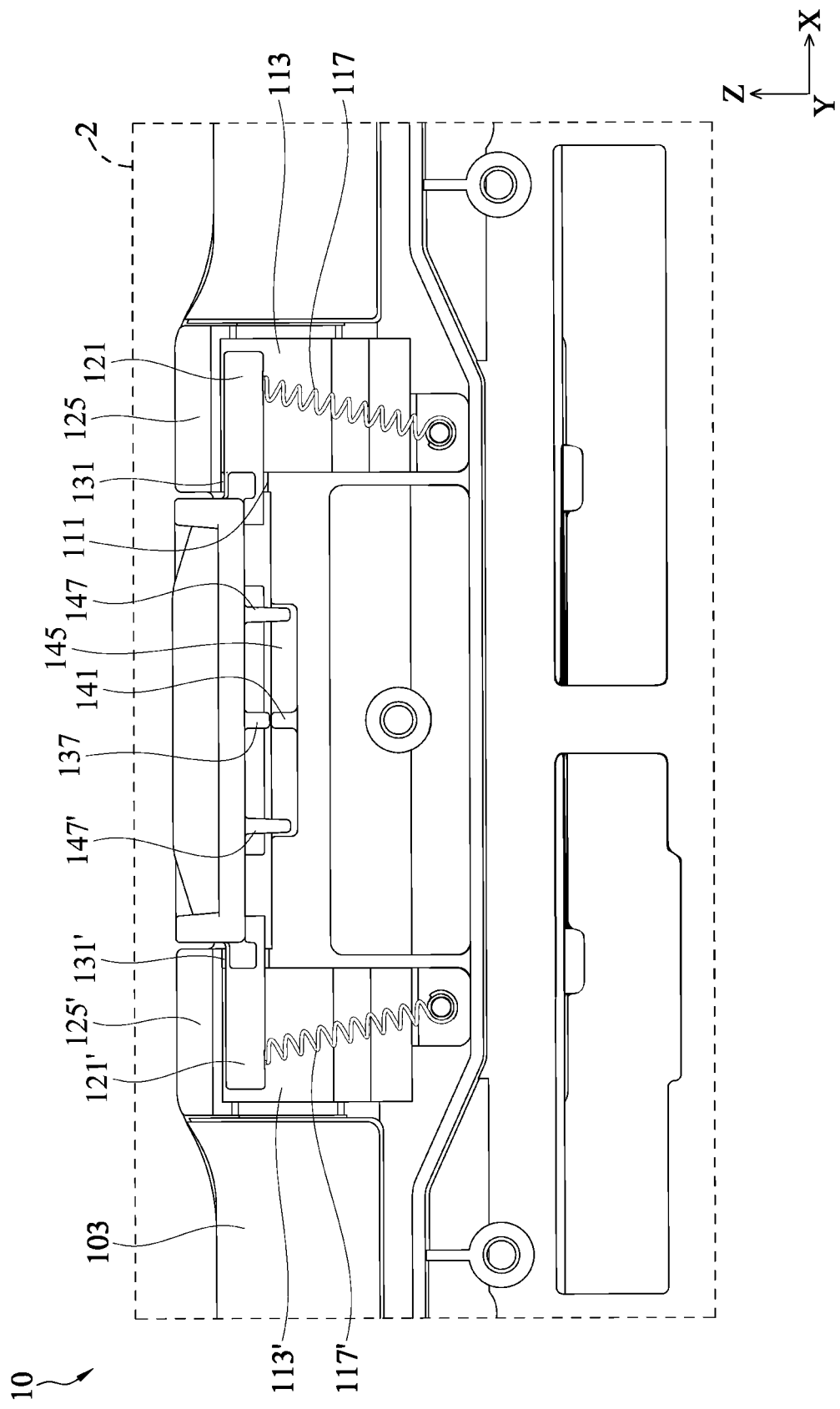
FIG. 3 is a bottom view of a part of the electronic device framed in FIG. 1.
Figure 4:
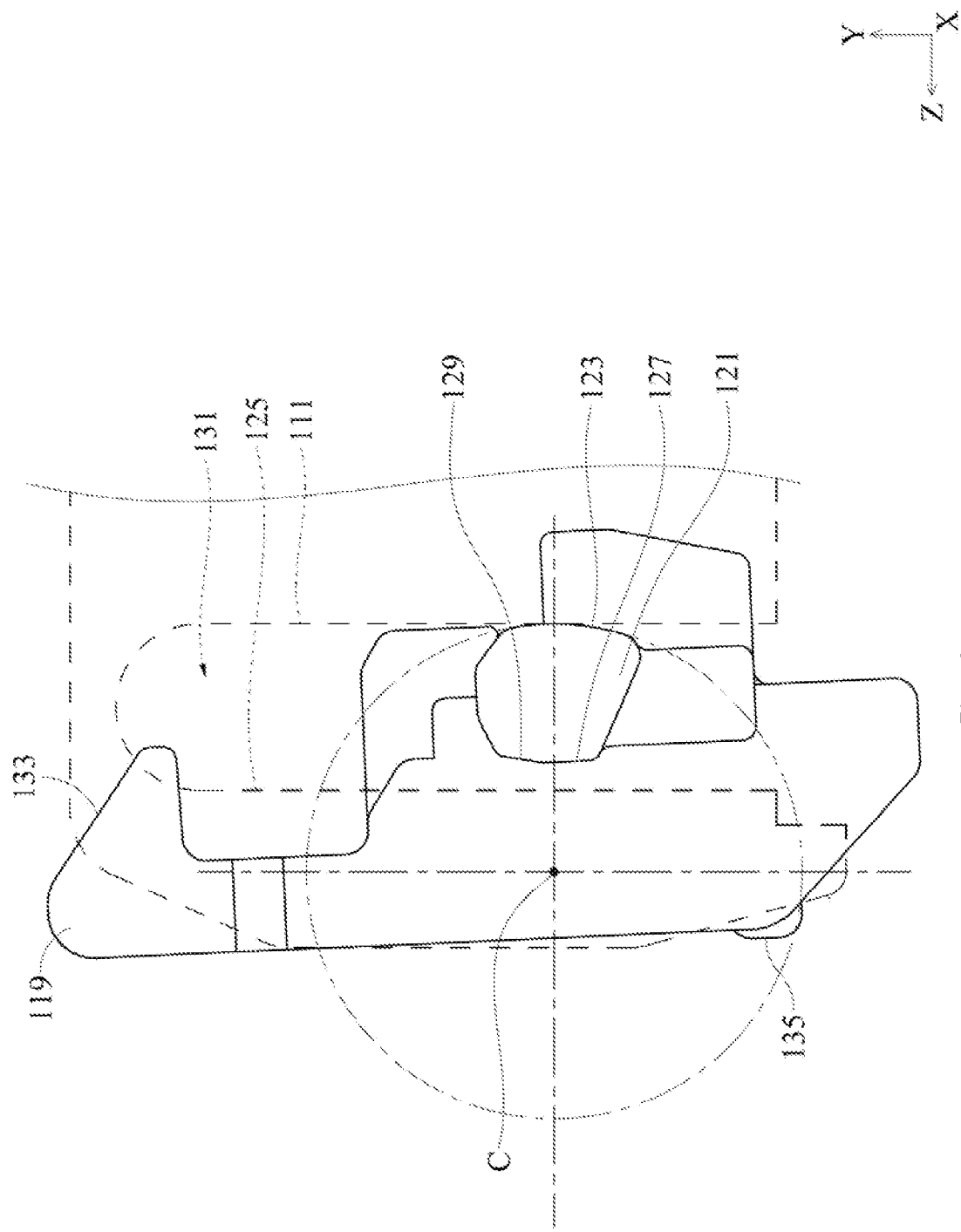
FIG. 4 is a partial side view of the electronic device according to the first embodiment of the present invention, to show a buckle and a center of an arc-shaped surface.

Refer to FIG. 1 to FIG. 4. FIG. 1 is a three-dimensional view of an electronic device according to a first embodiment of the present invention; FIG. 2 is a front view of a part 2 of the electronic device framed in FIG. 1. FIG. 3 is a bottom view of a part 2 of the electronic device framed in FIG. 1. FIG. 4 is a partial side view of the electronic device according to the first embodiment of the present invention, to show a buckle and a center of an arc-shaped surface. As shown in FIG. 1 to FIG. 4, in this embodiment, the electronic device 10 includes a first case 101, a second case 103, and a locking assembly 105. The first case 101 includes a first fixing surface 107, and the first fixing surface 107 has a locking part 109. The second case 103 includes a second fixing surface 111 and two receiving grooves (113, 113'), and the two receiving grooves (113, 113') are respectively arranged on two sides of the second fixing surface 111. The locking assembly 105 includes a buckle 115 and two elastic elements (117, 117'). The buckle 115 has a hook part 119 and two fixing rods (121, 121'), and the two fixing rods (121, 121') are arranged on two sides of the hook part 119. In addition, it can be seen from FIG. 3 that, one end of each of the fixing rods (121, 121') abuts against the second fixing surface 111 and slides relative to the second fixing surface 111, and another end of each of the fixing rods extends into the corresponding receiving groove (113, 113'). The hook part 119 is configured to buckle to the locking part 109. It can be seen from FIG. 2 and FIG. 3 that, the two elastic elements (117, 117') are respectively accommodated in the two receiving grooves (113, 113'), and one end of each of the elastic elements (117, 117') is connected to the second case 103, and another end of each of the elastic elements is connected to the fixing rod (121, 121').

Refer to FIG. 4. In FIG. 4, merely the fixing rod 121 on one side is used as an example for description, and the fixing rod 121' on another side also has a corresponding structure. In this embodiment, each of the fixing rods (121, 121') has an arc-shaped surface 123. The arc-shaped surface 123 abuts against the second fixing surface 111, and a center C formed by the arc-shaped surface 123 is away from the fixing rod (121, 121') (described in detail later).

As further shown in FIG. 1, the electronic device 10 may be a flip electronic product (for example, a notebook computer or a tablet computer with a detachable keyboard). For example, if the electronic device 10 is a notebook computer, the first case 101 may be one of a screen and a keyboard, and the second case 103 may be the other of the screen and the keyboard. If the electronic device 10 is a tablet computer with a detachable keyboard, the first case 101 may be one of the tablet computer and the detachable keyboard, and the second case 103 may be the other of the tablet computer and the detachable keyboard. Any electronic device 10 having a first case 101 and a second case 103 that can be opened and closed with each other can be implemented, and the present invention is not limited thereto. In addition, when the first case 101 and the second case 103 approach to each other, the first fixing surface 107 is adjacent to the second fixing surface 111. The first fixing surface 107 may be substantially parallel to the second fixing surface 111, so that the buckle 115 can easily slide on the second fixing surface 111 and be buckled to the locking part 109 of the first fixing surface 107.

As further shown in FIG. 2 and FIG. 3, the two receiving grooves (113, 113') may be adjacently arranged on the two sides of the second fixing surface 111, and the two sides of the second fixing surface 111 are respectively in communication with the two receiving grooves (113, 113'), so that the two fixing rods (121, 121') can respectively extend into the corresponding receiving grooves (113, 113') through the second fixing surface 111 when the buckle 115 abuts against the second fixing surface 111. In addition, the two elastic elements (117, 117') can be respectively arranged in the corresponding receiving grooves (113, 113'), and one end of each of the elastic elements (117, 117') can be locked or welded to the second case 103. Another end of each of the elastic elements (117, 117') can be hooked to the corresponding fixing rod (121, 121'). Specifically, it can be seen from FIG. 2 that, each of the fixing rods (121, 121') has a hook hole 124, and another end of each of the elastic elements (117, 117') can be hooked to the hook hole 124, so that the two elastic elements (117, 117') can respectively pull the two fixing rods (121, 121') through their own elastic force in a normal condition, and that the buckle 115 can slide against the second fixing surface 111 when the buckle 115 slides relative to the second fixing surface 111. The elastic elements (117, 117') may be, for example, springs or elastic cords.

As further shown in FIG. 3 and FIG. 4, it should be noted that in FIG. 4, only the fixing rod 121 is used as an example, and since the fixing rod 121' is the same as fixing rod 121, details are not described herein again. The two elastic elements (117, 117') are omitted in FIG. 4. In this embodiment, the two receiving grooves (113, 113') have retaining walls (125, 125') respectively. Each of the fixing rods (121, 121') has a first inclined surface 127 and a second inclined surface 129 on a side relative to the arc-shaped surface 123. In addition, the retaining walls (125, 125') respectively form an opening (131, 131') with the second fixing surface 111, and the fixing rods (121, 121') respectively slide within the two openings (131, 131'). When the fixing rods (121, 121') slide relative to the second fixing surface 111, the first inclined surface 127 and the second inclined surface 129 can respectively be in contact with and slide on the retaining walls (125, 125') (described later).

Figure 5:
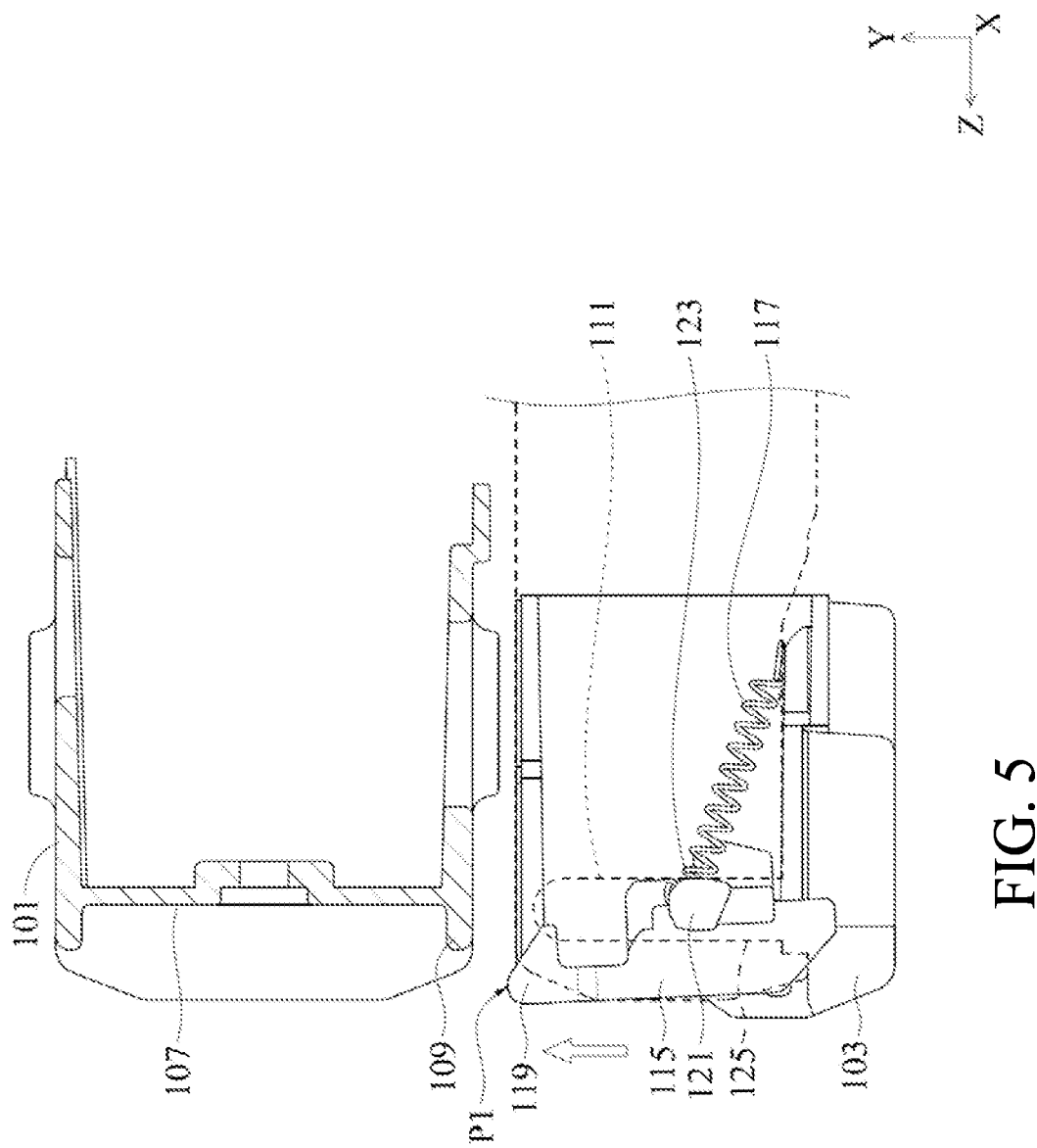
FIG. 5 is a schematic diagram of positions of a hook part and a locking part when the hook part is located at a first position according to the first embodiment of the present invention.
Figure 6:
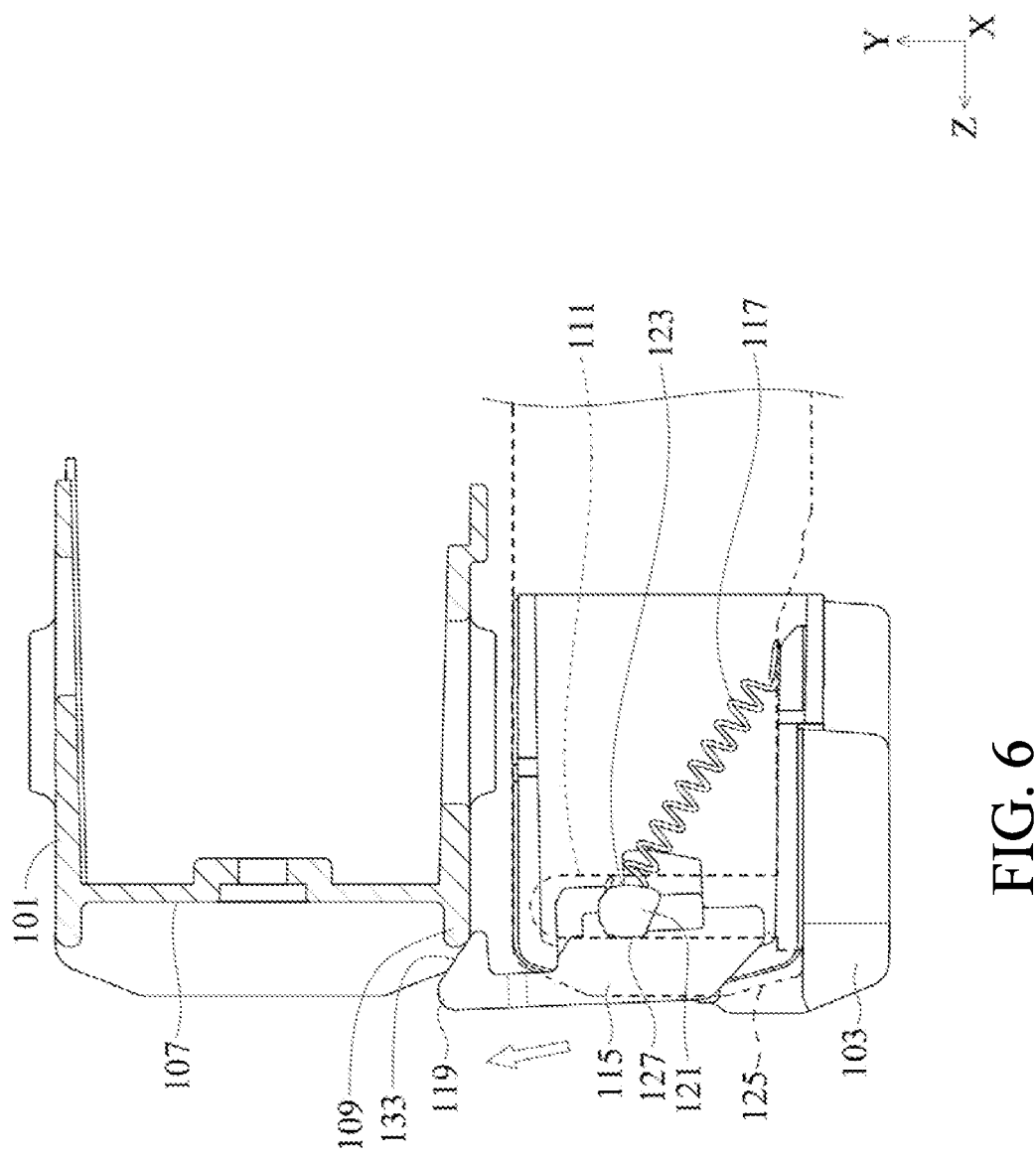
FIG. 6 is a schematic diagram of positions of the hook part and the locking part when the hook part is located between the first position and a second position according to the first embodiment of the present invention.
Figure 7:
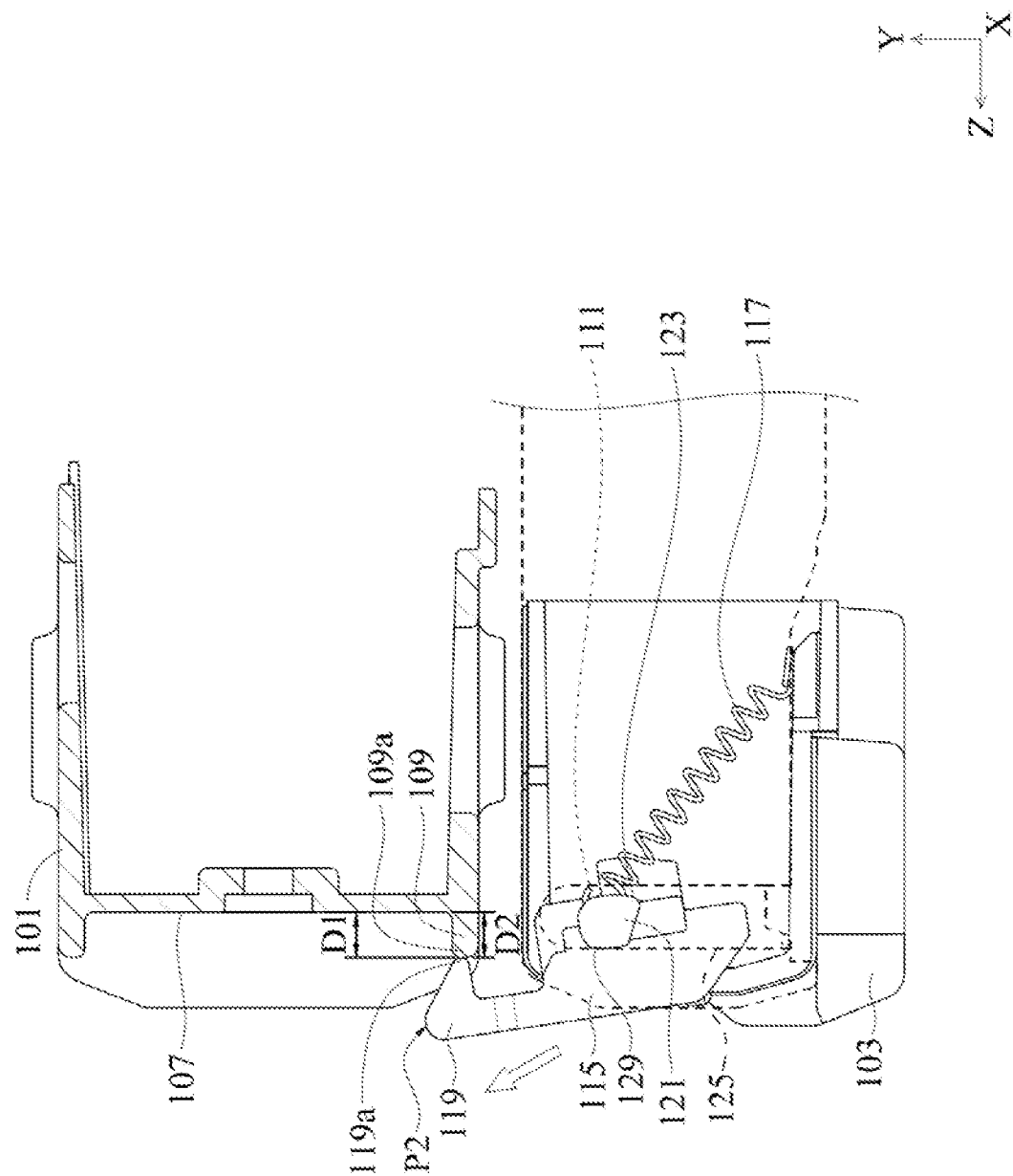
FIG. 7 shows a position relationship between the hook part and the locking part when the hook part is located at the second position according to the first embodiment of the present invention.
Figure 8:
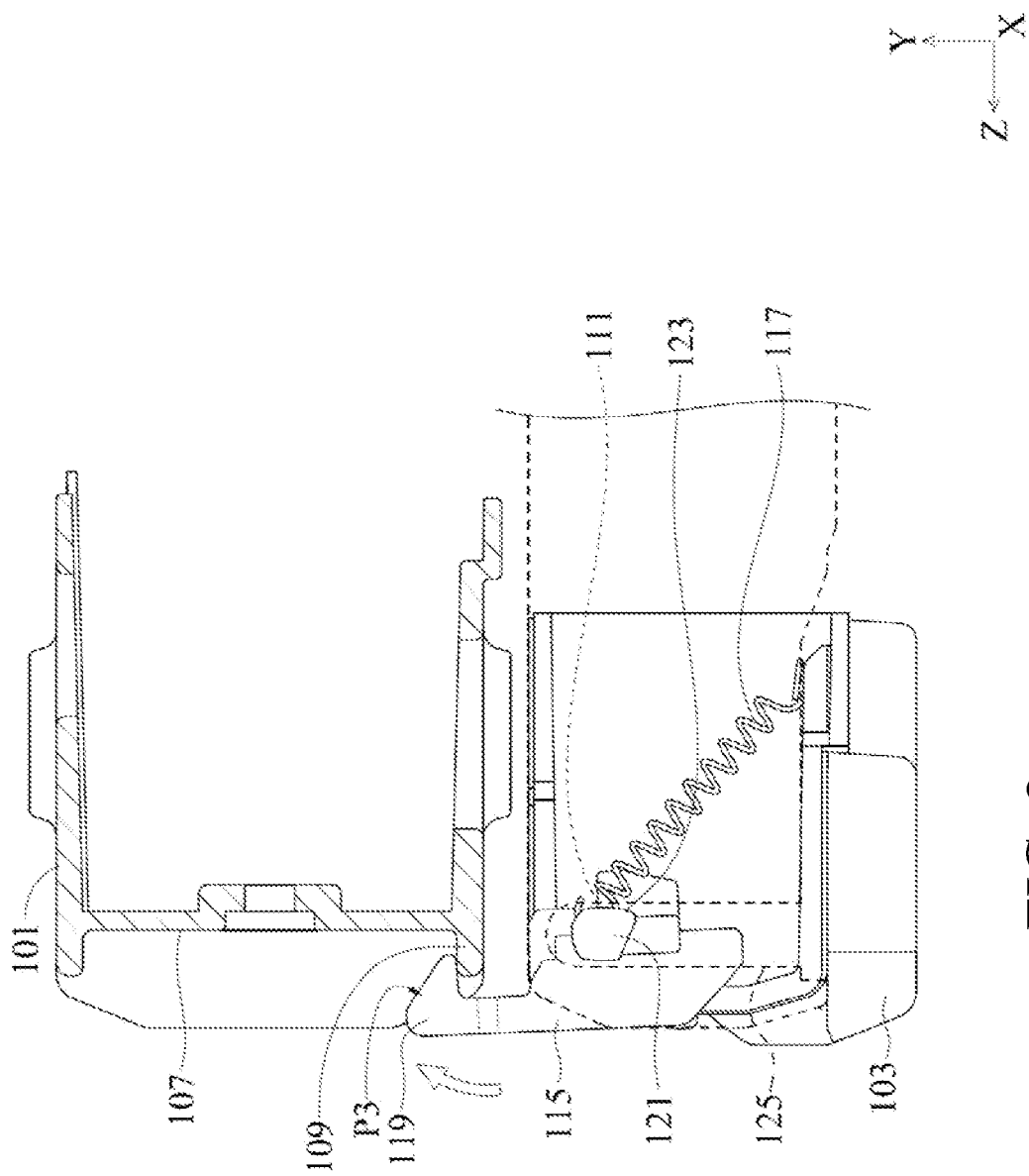
FIG. 8 shows a position relationship between the hook part and the locking part when the hook part is located at a third position according to the first embodiment of the present invention.

Refer to FIG. 5 to FIG. 8 together. FIG. 5 is a schematic diagram of positions of a hook part and a locking part when the hook part is located at a first position according to the first embodiment of the present invention. FIG. 6 is a schematic diagram of positions of the hook part and the locking part when the hook part is located between the first position and a second position according to the first embodiment of the present invention. FIG. 7 shows a position relationship between the hook part and the locking part when the hook part is located at the second position according to the first embodiment of the present invention. FIG. 8 shows a position relationship between the hook part and the locking part when the hook part is located at a third position according to the first embodiment of the present invention. FIG. 5 to FIG. 8 all use the fixing rod 121 on one side as an example, and since actuation and a structure of the fixing rod 121' on another side is the same as that of the fixing rod 121, the following descriptions of the fixing rod 121' may refer to the descriptions of the fixing rod 121. In this embodiment, as shown in FIG. 5 to FIG. 8, the hook part 119 may move to the first position P1, the second position P2, or the third position P3. When the hook part 119 slides from the first position P1 to the third position P3, the hook part 119 eccentrically rotates to the second position P2 based on the center C of the arc-shaped surface 123 (described later), and when the hook part 119 is located at the third position P3, the hook part 119 is buckled to the locking part 109.

As shown in FIG. 5, when the buckle 115 has not been actuated, the fixing rod 121 is subjected to the traction of the elastic element 117, so that the hook part 119 is maintained at the first position P1 in the normal condition. The arc-shaped surface 123 of the fixing rod 121 abuts against the second fixing surface 111.

As shown in FIG. 5 and FIG. 6, when the buckle 115 is actuated to make the hook part 119 move from the first position P1 to the second position P2, the fixing rod 121 is still subjected to the traction of the elastic element 117 initially. In this case, the arc-shaped surface 123 of the fixing rod 121 slides on the second fixing surface 111. When the buckle 115 is continuously actuated and the hook part 119 abuts against the locking part 109 as shown in FIG. 6, the hook part 119 can eccentrically rotate to the second position P2 based on the center C of the arc-shaped surface 123 (as shown in FIG. 7). When the hook part 119 is located between the first position P1 and the second position P2, the first inclined surface 127 is in contact with and slides on the retaining wall 125. Specifically, the hook part 119 has a guide surface 133. The guide surface 133 is in contact with the locking part 109 when the hook part 119 moves from the first position P1 to the second position P2, so that the buckle 115 is guided by the guide surface 133 and eccentrically rotates to the second position P2 based on the center C of the arc-shaped surface 123.

As shown in FIG. 7, when the hook part 119 is located at the second position P2, a distance between a top end 119a of the hook part 119 and the first fixing surface 107 is a first distance D1, and a distance between a top end 109a of the locking part 109 and the first fixing surface 107 is a second distance D2. In this case, the first distance D1 is substantially equal to the second distance D2. That is, when the hook part 119 eccentrically rotates to the locking part 109 based on the center C of the arc-shaped surface 123, the hook part 119 can move from the second position P2 to the third position P3 along the locking part 109 (as shown in FIG. 8). In addition, when the hook part 119 is located at the second position P2, the arc-shaped surface 123 of the fixing rod 121 is away from the second fixing surface 111, and the second inclined surface 129 is in contact with and slides on the retaining wall 125, so that the fixing rod 121 can slide on the retaining wall 125 through the second inclined surface 129.

As shown in FIG. 8, when the hook part 119 is located at the third position P3, the hook part 119 is buckled to the locking part 109. It should be noted that, to reset the hook part 119 from the third position P3 to the first position P1, the buckle 115 can be actuated again, so that the fixing rod 121 can rotate relative to the second fixing surface 111 by using the arc-shaped surface 123 as a fulcrum, thereby causing the hook part 119 to be separated from the locking part 109. In addition, when the hook part 119 moves from the third position P3 to the second position P2 along the locking part 109, the hook part 119 can move along the locking part 109 again. Moreover, when the hook part 119 continuously moves from the second position P2 to the first position P1, the fixing rod 121 is subjected to the traction of the elastic element 117, so that the hook part 119 is reset from the second position P2 to the first position P1. In this case, the arc-shaped surface 123 abuts against the second fixing surface 111 again.

As further shown in FIG. 2, in this embodiment, the buckle 115 further includes an operating part 135. The arc-shaped surface 123 is located between the operating part 135 and the hook part 119. When the operating part 135 is actuated, the buckle 115 can move between the first position P1, the second position P2, and the third position P3. In this embodiment, actuation of the operating part 135 may be that a force is applied to the operating part 135 in a Y-axis direction as shown in FIG. 2, to push the buckle 115 to slide relative to the second fixing surface 111, or may be that a force is applied to the operating part 135 (that is, the operating part 135 is pressed) in a negative direction of a Z-axis as shown in FIG. 2. In this embodiment, after the operating part 135 is actuated to rotate the buckle 115, the hook part 119 can first be made to eccentrically rotate based on the center C of the arc-shaped surface 123, and when the hook part 119 moves from the first position P1 to the second position P2, the hook part 119 can move to the second position P2 and the third position P3 with or without being in contact with the locking part 109 (that is, the first distance D1 may be greater than or equal to the second distance D2), and the hook part 119 is buckled to the locking part 109 when being located at the third position P3.

Figure 9:
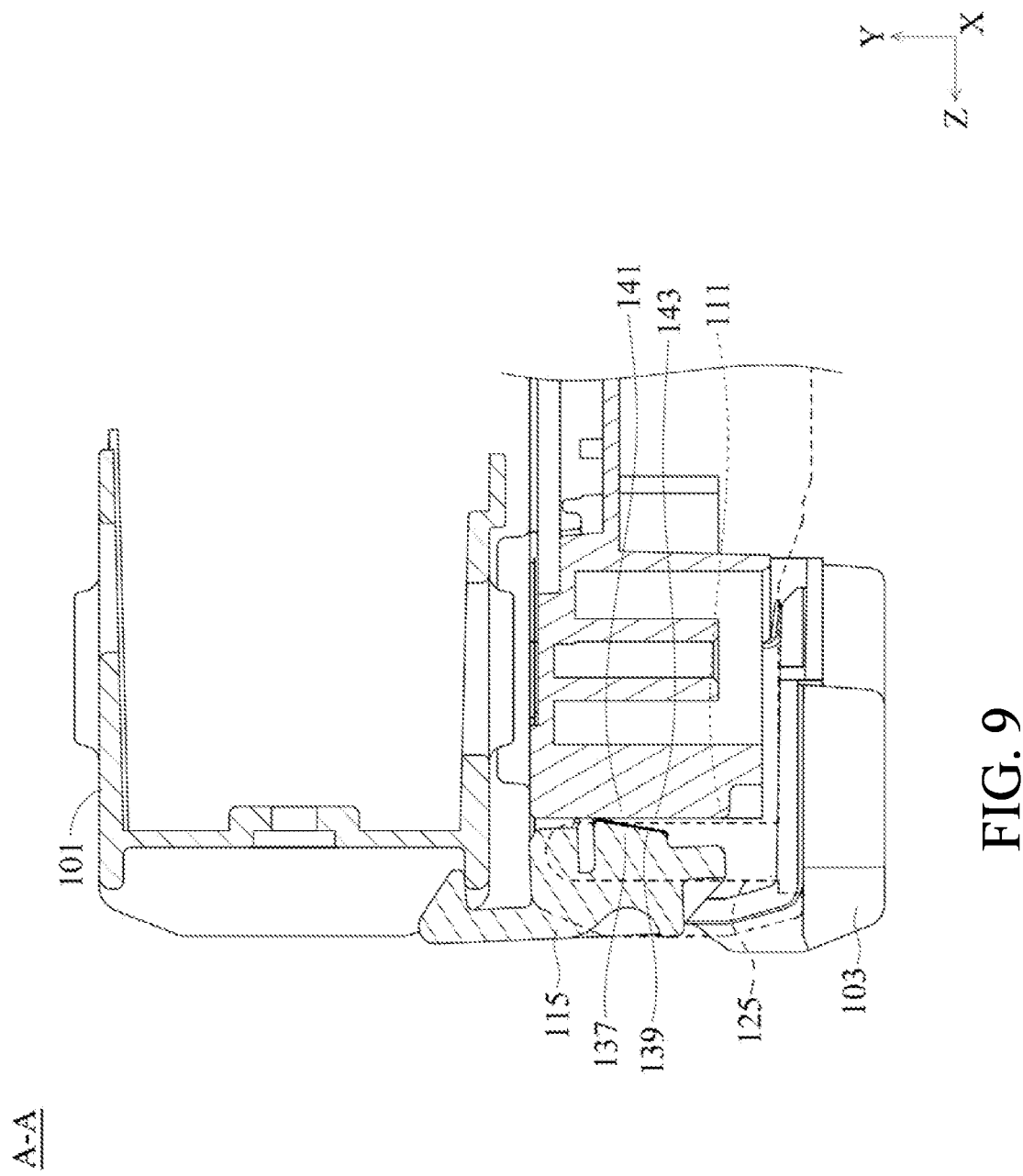
FIG. 9 is a cross-sectional view of FIG. 2 in a direction A-A, showing a position relationship between a first baffle and a second baffle when the hook part is located at the third position.

Refer to FIG. 1 and FIG. 9 together. FIG. 9 is a cross-sectional view of FIG. 2 in a direction A-A, showing a position relationship between a first baffle and a second baffle when the hook part is located at the third position. As shown in FIG. 1 and FIG. 9, in this embodiment, the buckle 115 further includes a first baffle 137 (referring to FIG. 3 and FIG. 9). The first baffle 137 extends to the second fixing surface 111 and has a first contact surface 139. The second fixing surface 111 includes a second baffle 141 (referring to FIG. 3 and FIG. 9). The second baffle 141 has a second contact surface 143. The first contact surface 139 is separated from the second contact surface 143 when the hook part 119 is located at the first position P1 or the third position P3. The first contact surface 139 is in contact with the second contact surface 143 when the hook part 119 is located at the second position P2. It should be noted that, when the hook part 119 is displaced from the second position P2 to the first position P1 or the third position P3, the buckle 115 can slide on the second contact surface 143 of the second baffle 141 through the first contact surface 139 of the first baffle 137, enabling the buckle 115 to slide on the second fixing surface 111 more smoothly. As further shown in FIG. 3, the second fixing surface 111 further includes a limiting groove 145. The limiting groove 145 is located between the second baffle 141 and the receiving groove 113. Third baffles (147, 147') are respectively arranged on two sides of the buckle 115, and the two third baffles (147, 147') extend into the limiting groove 145. Therefore, when the buckle 115 slides relative to the second fixing surface 111, the limiting groove 145 can play a role of limiting the third baffles (147, 147') in a horizontal direction (for example, an X-axis direction in FIG. 3), so as to limit the two third baffles (147, 147') in the limiting groove 145. In this way, deflection of the buckle 115 in the horizontal direction (for example, the X-axis direction in FIG. 3) can be reduced, enabling a movement track of the buckle 115 to be more stable. The buckle 115 may only have one of the baffle 147 or the baffle 147'.

Figure 10:
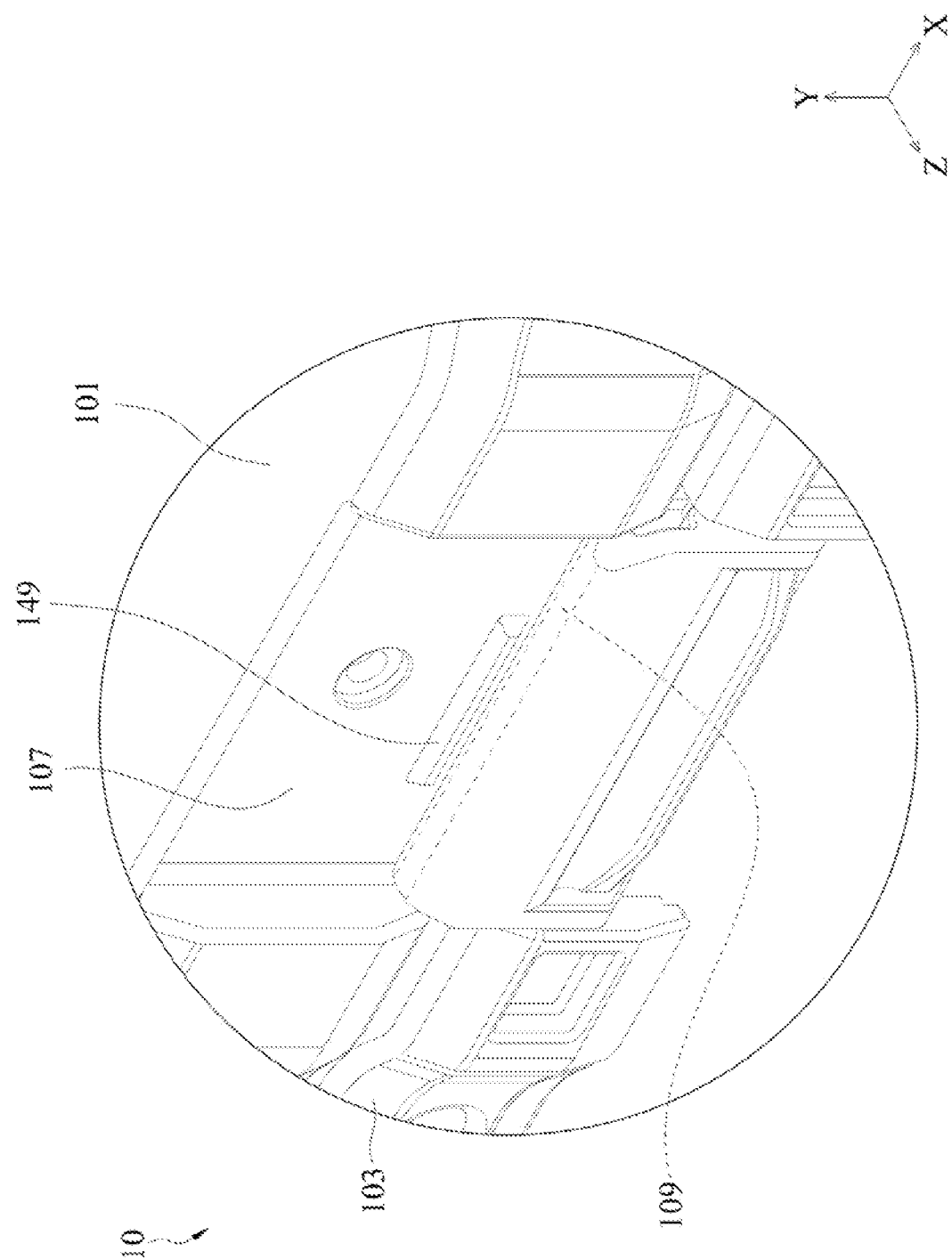
FIG. 10 is a partial three-dimensional view of an electronic device according to a second embodiment of the present invention.

Refer to FIG. 1 to FIG. 10 together. FIG. 10 is a partial three-dimensional view of an electronic device according to a second embodiment of the present invention. As shown in FIG. 1 to FIG. 10, in this embodiment, the first fixing surface 107 further includes another locking part 149, and the hook part 119 is buckled to one of the locking part 109 and the another locking part 149. When the hook part 119 is located at the first position P1, the locking part 109 is closer to the hook part 119 than the locking part 149. In other words, a distance between the hook part 119 and the locking part 149 is greater than a distance between the hook part 119 and the locking part 109. Based on this, the buckle 115 can buckle the hook part 119 to the locking part 109 or the locking part 149 according to a distance between the first case 101 and the second case 103. For example, in the second embodiment, an external accessory (not shown in this figure) may be added to the electronic device 10, and the external accessory may be, for example, a detachable handle. Due to the thickness of the external accessory, after the external accessory is mounted on the first case 101 or the second case 103, the distance between the first case 101 and the second case 103 is increased. In this case, the hook part 119 cannot be buckled to the farther locking part 149, and it is appropriate to buckle the hook part 119 to the closer locking part 109. When no external accessory is mounted on the first case 101 or the second case 103, the distance between the first case 101 and the second case 103 keeps unchanged. In this case, the hook part 119 can be buckled to the locking part 149, and it is appropriate to buckle the hook part 119 to the locking part 149.

In view of the above, according to the electronic device 10 provided in an embodiment of the present invention, when the hook part 119 slides from the first position P1 to the third position P3, the hook part 119 eccentrically rotates to the second position P2 based on the center C of the arc-shaped surface 123 (that is, eccentric rotation), so that the hook part 119 can be buckled to the locking part 109 when the hook part 119 is located at the third position P3. In this way, the first case 101 and the second case 103 can be buckled and fixed to each other.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a first case, comprising a first fixing surface, wherein the first fixing surface comprises a locking part;
a second case, comprising a second fixing surface and two receiving grooves, wherein the two receiving grooves are respectively arranged on two sides of the second fixing surface, wherein each of the two receiving grooves comprises a retaining wall, each of the retaining walls and the second fixing surface define an opening; and
a locking assembly, comprising:
a buckle, comprising a hook part and two fixing rods, wherein the two fixing rods are arranged on two sides of the hook part, one end of each of the fixing rods is disposed in one of the openings, another end of each of the fixing rods extends into the corresponding receiving groove, and the hook part is configured to buckle to the locking part; and
two elastic elements, respectively accommodated in one of the two receiving grooves, wherein one end of each of the elastic elements is connected to the second case, and another end of each of the elastic elements is connected to one of the fixing rods so that the fixing rods are subject to the traction of the elastic elements to urge the fixing rods to abut against the second fixing surface; wherein a width of the opening is broader than a width of each of the fixing rods.

2. The electronic device according to claim 1, wherein each of the fixing rods comprises an arc-shaped surface, the arc-shaped surface abuts against the second fixing surface, and a center formed by the arc-shaped surface is located beyond the fixing rod.

3. The electronic device according to claim 2, wherein the hook part is capable of moving to a first position, a second position, or a third position, the hook part eccentrically rotates to the second position based on the center of the arc-shaped surface when the hook part moves from the first position to the third position, and the hook part is buckled to the locking part when the hook part is located at the third position.

4. The electronic device according to claim 3, wherein the hook part comprises a guide surface, and the guide surface is in contact with the locking part when the hook part moves from the first position to the second position, so that the buckle is guided by the guide surface and eccentrically rotates to the second position.

5. The electronic device according to claim 4, wherein when the hook part is located at the second position, a distance between a top end of the hook part and the first fixing surface is a first distance, and a distance between a top end of the locking part and the first fixing surface is a second distance, wherein the first distance is substantially equal to the second distance.

6. The electronic device according to claim 3, wherein the buckle comprises a first baffle, and the first baffle extends to the second fixing surface and comprises a first contact surface; the second fixing surface comprises a second baffle, and the second baffle comprises a second contact surface; and the first contact surface is separated from the second contact surface when the hook part is located at the first position or the third position, and the first contact surface is in contact with the second contact surface when the hook part is located at the second position.

7. The electronic device according to claim 6, wherein the second fixing surface comprises a limiting groove, and the limiting groove is located between the second baffle and one of the receiving grooves; and the buckle comprises a third baffle, and the third baffle extends into the limiting groove.

8. The electronic device according to claim 3, wherein each of the two fixing rods comprises a first inclined surface and a second inclined surface on a side relative to the arc-shaped surface, the first inclined surface is in contact with and slides on the retaining wall when the hook part is located between the first position and the second position, and the second inclined surface is in contact with and slides on the retaining wall when the hook part is located at the second position.

9. The electronic device according to claim 8, wherein the two fixing rods are movably disposed within the two openings.

10. The electronic device according to claim 3, wherein the buckle further comprises an operating part, the operating part is located on one side of the center of the arc-shaped surface, the hook part is located on another side of the center of the arc-shaped surface, and the buckle moves from the first position to the second position and the third position when the operating part is actuated.

11. The electronic device according to claim 1, wherein the first fixing surface comprises another locking part, and the hook part is buckled to one of the locking part and the another locking part.

12. A locking assembly, arranged in an electronic device, and comprising:
    a buckle, comprising a hook part and two fixing rods, wherein the two fixing rods are arranged on two sides of the hook part, each of the fixing rods moves relative to the electronic device, and the hook part is configured to buckle to the electronic device; and
    two elastic elements, wherein one end of each of the elastic elements is fixed to the electronic device, and another end of each of the elastic elements is connected to one of the fixing rods, wherein
    each of the fixing rods comprises an arc-shaped surface, the arc-shaped surface faces the electronic device, and a center formed by the arc-shaped surface is located beyond the fixing rod.

13. The locking assembly according to claim 12, wherein the hook part has a first position, a second position, and a third position, the hook part eccentrically rotates to the second position based on the center of the arc-shaped surface when the hook part slides from the first position to the third position, and the hook part is buckled to the electronic device when the hook part is located at the third position.

14. The locking assembly according to claim 13, wherein the hook part comprises a guide surface, and the guide surface is in contact with the electronic device when the hook part moves from the first position to the second position, so that the buckle is guided by the guide surface and eccentrically rotates to the second position.

15. The locking assembly according to claim 14, wherein the buckle comprises a first baffle, the first baffle extends to the electronic device and comprises a first contact surface, the first contact surface is separated from the electronic device when the hook part is located at the first position or the third position, and the first contact surface is in contact with the electronic device when the hook part is located at the second position.

16. The locking assembly according to claim 13, wherein each of the two fixing rods comprises a first inclined surface and a second inclined surface on a side relative to the arc-shaped surface, the first inclined surface is in contact with the electronic device when the hook part is located between the first position and the second position, and the second inclined surface is in contact with the electronic device when the hook part is located at the second position.

17. The locking assembly according to claim 13, wherein the buckle further comprises an operating part, the operating part is located on one side of the center of the arc-shaped surface, the hook part is located on another side of the center of the arc-shaped surface, and the buckle moves from the first position to the second position and the third position when the operating part is actuated.

18. The locking assembly according to claim 12, wherein each of the fixing rods has an eccentric, non-circular cross-section.

19. The locking assembly according to claim 18, wherein the fixing rods are configured to move within an opening defined by opposing retaining walls, wherein the opening has larger dimensions than corresponding dimensions of the fixing rods, allowing movement of the fixing rods in orthogonal directions.

20. An electronic device, comprising:
    a first case, comprising a first fixing surface, wherein the first fixing surface comprises a locking part;
    a second case, comprising a second fixing surface and two receiving grooves, wherein the two receiving grooves are respectively arranged on two sides of the second fixing surface; and
    a locking assembly, comprising:
        a buckle, comprising a hook part and two fixing rods, wherein the two fixing rods are arranged on two sides of the hook part, each of the fixing rods moves relative to the second fixing surface, and the hook part is configured to buckle to the locking part; and
        two elastic elements, respectively accommodated in one of the two receiving grooves, wherein one end of each of the elastic elements is connected to the second case, and another end of each of the elastic elements is connected to one of the fixing rods, wherein
        each of the fixing rods comprises an arc-shaped surface, the arc-shaped surface abuts against the second fixing surface, and a center formed by the arc-shaped surface is located beyond the fixing rod.

* * * * *